United States Patent
Chen

(10) Patent No.: US 7,937,608 B2
(45) Date of Patent: May 3, 2011

(54) CLOCK GENERATING CIRCUIT AND DIGITAL CIRCUIT SYSTEM INCORPORATING THE SAME

(75) Inventor: Yi-Lin Chen, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 662 days.

(21) Appl. No.: 11/965,736

(22) Filed: Dec. 28, 2007

(65) Prior Publication Data

US 2008/0162975 A1  Jul. 3, 2008

(30) Foreign Application Priority Data

Dec. 28, 2006 (TW) .............................. 95149499 A

(51) Int. Cl.
*G06F 1/00* (2006.01)
*G06F 1/04* (2006.01)
(52) U.S. Cl. ......... 713/600; 713/400; 713/401; 713/500
(58) Field of Classification Search .................. 713/400, 713/500, 600, 401
See application file for complete search history.

(56) References Cited

U.S. PATENT DOCUMENTS

| | | | | |
|---|---|---|---|---|
| 5,490,182 A * | 2/1996 | Arai | ............................... | 375/376 |
| 5,509,037 A * | 4/1996 | Buckner et al. | ............... | 375/371 |
| 6,161,173 A * | 12/2000 | Krishna et al. | ................. | 712/214 |
| 6,647,506 B1 * | 11/2003 | Yang et al. | ..................... | 713/503 |
| 6,687,320 B1 | 2/2004 | Chiu | | |
| 6,910,125 B2 | 6/2005 | Wise | | |
| 7,627,003 B1 * | 12/2009 | Fouts et al. | .................... | 370/503 |
| 2005/0066148 A1 * | 3/2005 | Luick | ................................. | 712/1 |
| 2005/0280565 A1 * | 12/2005 | Kushner et al. | ............... | 341/120 |
| 2009/0138674 A1 * | 5/2009 | Chang et al. | .................... | 712/23 |

FOREIGN PATENT DOCUMENTS

EP  0 987 822 A2  3/2000

* cited by examiner

*Primary Examiner* — Mark Connolly
(74) *Attorney, Agent, or Firm* — Winston Hsu

(57) ABSTRACT

A digital circuit system includes: a register, for receiving and registering digital data; an operation unit, for operating and generating resulting data according to the digital data registered in the first registering unit; a second register, for receiving and registering the resulting data; a multi-phase clock signal generating unit, for generating a plurality of reference clock signals having different phases with each other; a first selector, for selecting one of the reference clock signals to output a first clock signal to the first registering unit; and a second selector, for selecting another of the reference clock signals to output a second clock signal to the second registering unit.

8 Claims, 2 Drawing Sheets

CLOCK GENERATING CIRCUIT AND DIGITAL CIRCUIT SYSTEM INCORPORATING THE SAME

BACKGROUND OF THE INVENTION

1. Field of the Invention

The present invention relates to a clock signal generating circuit and a digital circuit system incorporating the same, and particularly relates to a clock signal generating circuit utilizing a multi-phase clock signal to generate clock signals having specific time delay and a digital circuit system incorporating the same.

2. Description of the Prior Art

In the field of digital logic operation, a register device such as a flip-flop is utilized for registering the temporary operation value or operation result of a digital logic operation circuit, and a pipeline structure is formed thereby. For such digital logic operation circuits, a whole operation can be regarded as separated by a plurality of registering devices to form a plurality of operation stages in the time domain. Each operation stage consists of a part of the logic operation circuit, which can perform a complete operation function. The above-mentioned registering devices can be triggered by clock signals to register the operation value of each operation state, and the frequency of clock signals determine the operation frequency of the digital logic operation circuit.

In practice, since the logic operation circuit including logic components must wait for a specific time to perform a desired operation due to the circuit delay thereof, a certain time delay exists between a registering device for triggering a previous operation stage and a registering device for triggering a next operation stage. In this situation, although the circuit design is correct, incorrect registered data may still be produced due to the wrong sampling time generated by the triggering registering devices. A delay circuit for generating the above-mentioned specific time delay usually consists of passive electronic devices such as resistors and capacitors. Therefore, the delay time is fixed. In this situation, the application of such a system is limited; that is, the digital logic circuit in whole may obtain grossly incorrect operation results if the frequency of the clock signal changes. Also, in CAD (Computer-Aided Design) applications, for example, the burden upon the processor will raise. In addition, such circuits will be largely influenced by PVT (Process, Voltage, and Temperature), and the synchronization of the signal will happen.

SUMMARY OF THE INVENTION

Therefore, the present invention provides a clock signal generating circuit, which utilizes a multi-phase generating circuit and at least one selector to select at least one of the clock signals as a clock signal source of the digital circuit.

One embodiment of the present invention discloses a digital circuit system, which comprises: a first registering unit, for receiving and registering digital data; an operation unit, coupled to the first registering unit, for operating and generating resulting data according to the digital data registered by the first registering unit; a second registering unit, coupled to the operation unit, for receiving and registering the resulting data; a multi-phase clock signal generating unit, for generating a plurality of reference clock signals, wherein the reference clock signals comprise different phases; a first selector, coupled to the multi-phase clock signal generating unit, for selecting one of the reference clock signals to output a first clock signal to the first registering unit; and a second selector, coupled to the multi-phase clock signal generating unit, for selecting another one of the reference clock signals to output a second clock signal to the second registering unit.

Another embodiment of the present invention discloses a clock signal generating apparatus, which comprises: a multi-phase clock signal generating unit, for generating a plurality of reference clock signals, wherein the reference clock signals comprise different phases; a control unit, for generating a first control signal and a second control signal; a first selector, coupled to the multi-phase clock signal generating unit, for selecting one of the reference clock signals to output a first clock signal according to the first control signal; and a second selector, coupled to the multi-phase clock signal generating unit, for selecting one of the reference clock signals to output a second clock signal according to the second control signal; wherein the second clock signal is a delay version of the first clock signal.

Another embodiment of the present invention discloses a clock signal generating method, which comprises: generating a plurality of reference clock signals, including different phases; selecting one of the reference clock signals to output a first clock signal; and selecting another one of the reference clock signals to output a second clock signal, wherein the second clock signal is a delayed version of the first clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
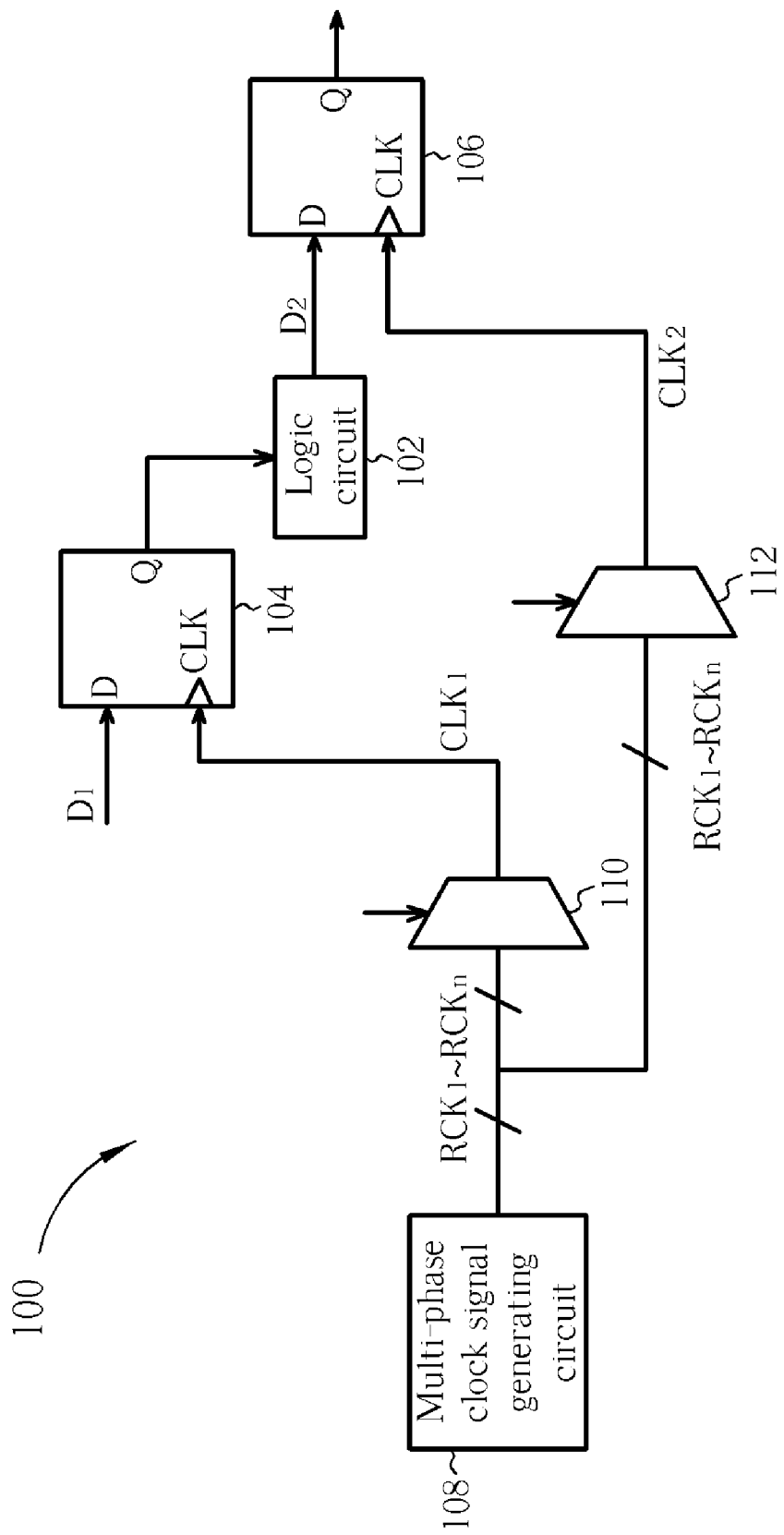
FIG. 1 is a schematic diagram illustrating a digital circuit system according to an embodiment of the present invention.

Please refer to FIG. 1. FIG. 1 is a schematic diagram illustrating a digital circuit system according to an embodiment of the present invention. The digital circuit system 100 includes a logic circuit 102, a first registering unit 104 and a second registering unit 106. The logic circuit 102 can be a circuit that forms all or part of a specific digital logic operation, and the first registering unit 104 before which and the second registering unit 106 after which form an operation stage of the specific digital logic operation. That is, the devices 102-106 can be a part of a pipeline structure. The digital data $D_1$ is the data transmitted from a previous circuit and registered to the first registering unit 104, and the digital data $D_2$ is the operation result of the registered digital data $D_1$ after being operated on by the logic circuit 102. Then the digital data $D_2$ is registered to the second registering unit 106. Normally, the logic circuit 102 consists of a plurality of basic logic operation units such as adders, multipliers, or logic gates, and the D flip-flop is a common implementation of the registering unit 104 and 106. The digital circuit system 100 further comprises a clock signal generating circuit, and the clock signal generating circuit includes a multi-phase clock signal generating circuit 108, a first selector 110 and a second selector 112. The multi-phase clock signal generating circuit 108 is used for generating a plurality of reference clock signals $RCK_1$-$RCK_N$ to the first selector 203 and the second selector 205, wherein the reference clock signals $RCK_1$-$RCK_N$ have different oscillating frequencies and different phases. Next, the first selector 110 and the second selector 112 select a first clock signal $CLK_1$ and a second clock signal $CLK_2$ from the reference clock signals $RCK_1$-$RCK_N$ according to a first control signal $CTRL_1$ and a second control signal $CTRL_2$. There is a specific phase difference between the first control signal $CTRL_1$ and the second control signal $CTRL_2$, such that the first control signal $CTRL_1$ and the second control signal $CTRL_2$ can be utilized as trigger clock signals for different operation stages. In this embodiment, the first selector 110 and the second selector 112 are implemented by multiplexers.

As known by persons skilled in the art, the phase difference between the first clock signal $CLK_1$ and the second clock signal $CLK_2$ indicate that a specific time delay exists between them. Therefore, according to the above-mentioned mechanism, clock signals with a specific time delay can be utilized to trigger sampling in different operation stages. It should be noted that, the front and back operation stages are taken as examples to explain the present invention, and are not meant to limit the scope. Any two operation stages, continuous or non-continuous, can utilize such a mechanism, and any device in the digital circuit system needing clock signals with different time delays, can utilize such mechanisms too. Of course, the clock signal generating circuit of the present invention is not limited to generating two clock signals, the number of selectors can be increased to generate more than two clock signals with different time delays. A detailed structure of the clock signal generating circuit of the present invention and a method for selecting the first clock signal $CLK_1$ and the second clock signal $CLK_2$ are further disclosed below.

Figure 2:
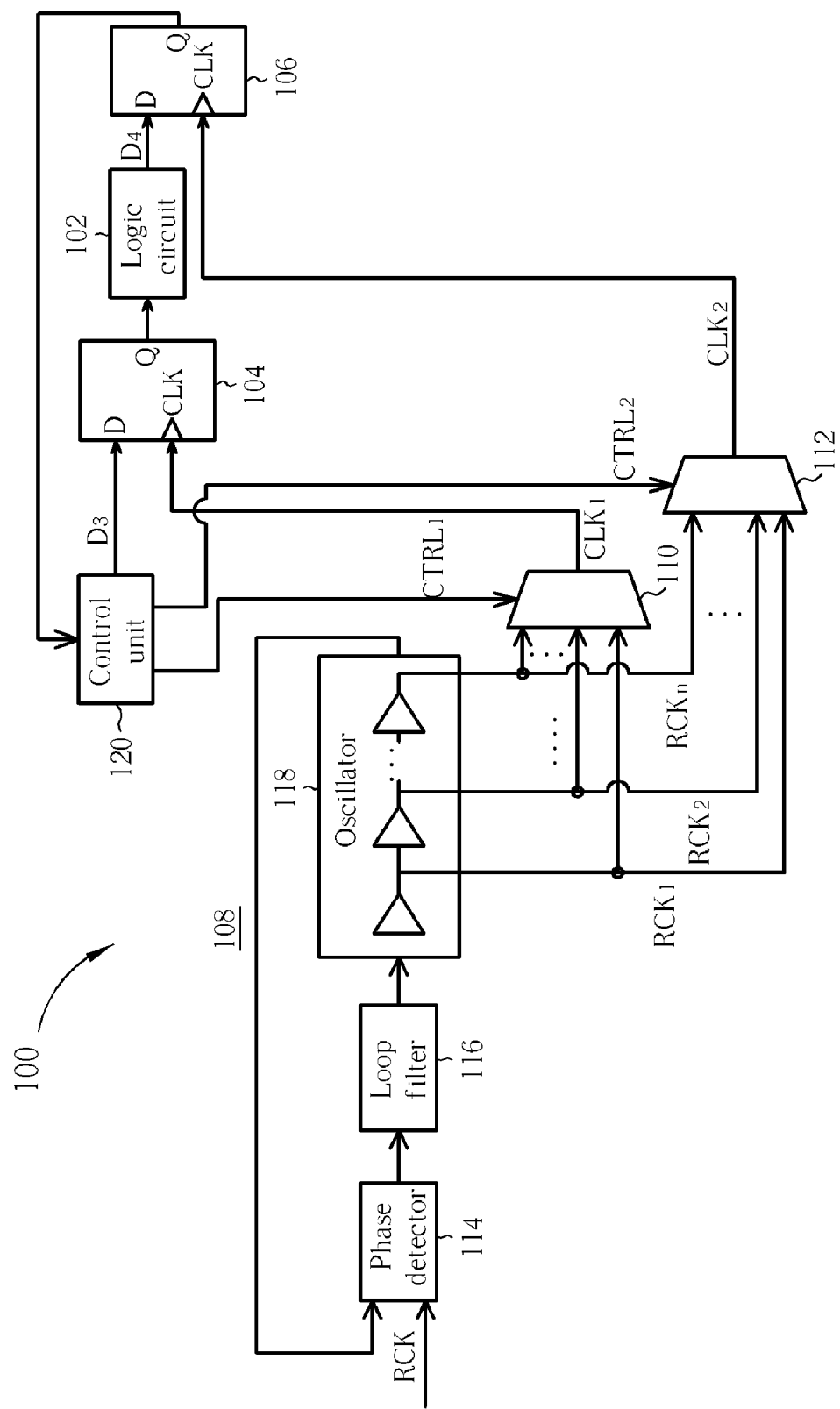
FIG. 2 is a schematic diagram illustrating the detail structures of the digital circuit system shown in FIG. 1.

FIG. 2 is a schematic diagram illustrating the detailed structures of the digital circuit system 100 shown in FIG. 1. In this embodiment, the multi-phase clock signal generating circuit 108 is a multi-phase PLL circuit which includes a phase detector 114, a loop filter 106 and a controllable oscillator 118, wherein the controllable oscillator 118 is a ring oscillator. The ring oscillator includes a plurality of delay devices, which are always coupled in the shape of a ring, and each of the delay devices corresponds to clock signals with different phases. Therefore, the multi-phase PLL circuit shown in FIG. 3 can generate a plurality of reference clock signals $RCK_1$-$RCK_N$. Also, the first selector 110 and the second selector 112 receiving the reference clock signals $RCK_1$~$RCK_N$ select a first clock signal CLK1 and a second clock CLK2 from the reference clock signals $RCK_1$-$RCK_N$ according to a first control signal $CTRL_1$ and a second control signal $CTRL_2$ generated from the control unit 120.

The control unit 120 is used for determining how the first selector 110 and the second selector 112 select the first clock signal $CLK_1$ and the second clock signal $CLK_2$, such that suitable time delays can be obtained for different operation stages. In this embodiment, the control unit 120 separates an operation stage consisting of circuit devices 102-106 from a main data path via switching a switch circuit or other mechanisms. Such an operation can also be performed without digital logic operation (for example, when the circuit is initialized). Also, a group of predetermined data patterns is inputted and is registered to the first registering unit 104. Next, the control unit 120 outputs combinations of the first clock signal $CLK_1$ and the second clock signal $CLK_2$ with different phase differences (different time delays) via the first control signal $CTRL_1$ and a second control signal $CTRL_2$, and observes data $D_4$ registered in the second registering unit 106 for different phase differences (different time delays). The data $D_4$ is the operation result of the predetermined data pattern $D_3$ processed by the logic circuit 102. Specifically, the data $D_4$ is compared with the known operation result, such that a suitable phase difference (time delay) between the first clock signal $CLK_1$ and the second clock signal $CLK_2$ can be selected. After that, the control unit 120 switches the above-mentioned operation stage to the main data path, and selects the first clock signal $CLK_1$ and the second clock signal $CLK_2$ according to the determined control signal.

As mentioned above, since the method of determining suitable time delays via selecting a multi-phase clock signal includes a mechanism for automatically adjusting and determining time, the burden on the CAD processor (as mentioned previously in an example) is reduced significantly. Also, a suitable time delay can be repeatedly adjusted (for example, during circuit initialization, or after a predetermined time). Therefore, the effect due to PVT variation can be compensated.

Those skilled in the art will readily observe that numerous modifications and alterations of the device and method may be made while retaining the teachings of the invention.

What is claimed is:

1. A digital circuit system, comprising:
   a first registering unit, for receiving and registering digital data;
   a logic circuit, including at least one logic unit, for performing a logic operation upon the digital data registered by the first registering unit to change a value of the digital data and accordingly generating resulting data;
   a second registering unit, coupled to the logic circuit, for receiving and registering the resulting data to generate an output data;
   a multi-phase clock signal generating unit, for generating a plurality of reference clock signals, wherein the reference clock signals comprise different phases;
   a first selector, coupled to the multi-phase clock signal generating unit, for selecting one of the reference clock signals to output a first clock signal to the first registering unit; and
   a second selector, coupled to the multi-phase clock signal generating unit, for selecting another of the reference clock signals to output a second clock signal to the second registering unit.

2. The digital circuit system of claim 1, wherein the multi-phase clock signal generating unit is a multi-PLL including a phase detector, a loop filter and an oscillator.

3. The digital circuit system of claim 2, wherein the oscillator is a ring oscillator for generating the reference clock signals.

4. The digital circuit system of claim 1, wherein the registering units comprise at least a D flip-flop.

5. The digital circuit system of claim 1, further comprising a control unit to receive the output data and to control the first selector and the second selector according to the output data.

6. A clock signal generating method, comprising:
   (a) generating a plurality of reference clock signals, including different phases;
   (b) selecting one of the reference clock signals to output a first clock signal;
   (c) selecting another of the reference clock signals to output a second clock signal,
   wherein the second clock signal is a delayed version of the first clock signal; and
   performing a logic operation upon first data registered by a first registering device to receiving the first clock signal to change a value of the first data and accordingly generating resulting data, and utilizing a second registering unit receiving the second clock signal to register the resulting data to generate output data.

7. The clock signal generating method of claim 6, further comprising:

utilizing the first clock signal to trigger a first registering unit for registering first data; and utilizing the second clock signal to trigger a second registering unit for registering second data.

8. The digital circuit system of claim 6, further comprising: performing the step (b) and (c) according to the output data.

* * * * *